US006651071B1

(12) United States Patent
O'Brien et al.

(10) Patent No.: US 6,651,071 B1
(45) Date of Patent: Nov. 18, 2003

(54) USER INTERFACE EDUCATIONAL DATABASE SYSTEM FOR MONITORING PROFICIENCY, PERFORMANCE AND EVALUATION OF STUDENT

(75) Inventors: Kathleen A. O'Brien, Milwaukee, WI (US); Georgine Loacker, Milwaukee, WI (US); Linda A. Ehley, Greenfield, WI (US); L. Kelly Talley, Milwaukee, WI (US); Robert F. O'Brien Hokanson, Wauwatosa, WI (US); Mary E. Diez, Milwaukee, WI (US); William H. Rickards, Milwaukee, WI (US)

(73) Assignee: Alverno College, Milwaukee, WI (US)

( * ) Notice: Subject to any disclaimer, the term of this patent is extended or adjusted under 35 U.S.C. 154(b) by 384 days.

(21) Appl. No.: 09/632,263

(22) Filed: Aug. 4, 2000

(51) Int. Cl.[7] ............................................. G06F 17/30
(52) U.S. Cl. ..................... 707/102; 707/1; 707/3; 707/5; 707/100; 707/104.1; 707/9; 706/927; 345/968; 434/322; 434/350; 434/353; 434/362
(58) Field of Search ................. 707/1–10, 100–104.1, 707/200–206, 500.1, 511–513; 709/203–205, 215–225; 706/45–50, 927; 705/1–10; 345/854, 978, 745, 835, 734, 969, 968; 434/322–360; 273/429–431

(56) References Cited

U.S. PATENT DOCUMENTS

| 5,537,618 A | * | 7/1996 | Boulton et al. | ............. 345/745 |
| 5,658,161 A | * | 8/1997 | Roberts et al. | ............. 434/353 |
| 5,727,950 A | * | 3/1998 | Cook et al. | .................. 345/705 |
| 5,970,124 A | * | 10/1999 | Csaszar et al. | ........ 379/101.01 |
| 6,011,949 A | * | 1/2000 | Shimomukai | ................ 434/169 |
| 6,064,856 A | * | 5/2000 | Lee et al. | .................... 345/733 |
| 6,091,930 A | * | 7/2000 | Mortimer et al. | ........... 434/118 |
| 6,146,148 A | * | 11/2000 | Stuppy | ........................ 434/322 |
| 6,149,441 A | * | 11/2000 | Pellegrino et al. | .......... 434/118 |
| 6,164,974 A | * | 12/2000 | Carlile et al. | ................ 434/118 |
| 6,368,110 B1 | * | 4/2002 | Koenecke et al. | .......... 434/219 |
| 6,418,450 B2 | * | 7/2002 | Daudenarde | ................ 707/200 |
| 2002/0065824 A1 | * | 5/2002 | Rosenfelt et al. | ............... 707/9 |

FOREIGN PATENT DOCUMENTS

| EP | 0710943 | * | 5/1996 | ......................... 7/4 |
| WO | WO99/32986 | * | 7/1999 | ..................... 13/38 |
| WO | WO0203358 | * | 1/2002 | ......................... 5/6 |

OTHER PUBLICATIONS

Book entitled *Student Assessment–As–Learning at Alverno College*, Alverno College, 1994 by The Alveno College Faculty PP1–148.
Tin S et al A software tool for academic advisors for student performance follow–up, electrotechnical conference, 1994 proceedings, vol 3, pp 1012–1015.*
Plumb C et al. A successful process for developing performance–based outcomes for engineering student writing assessment, Frontiers in Education conferences, 2000,FIE 2000, 30th Annual, one page.*

(List continued on next page.)

Primary Examiner—Srirama Channavajjala
(74) Attorney, Agent, or Firm—George E. Haas; Quarles & Brady LLP (57) ABSTRACT

An educational institution requires that each student demonstrate proficiency in a plurality of abilities in order to receive a degree. A database is employed to store a portfolio of information evidencing each student's work related to those abilities. A user interface is provided to selectively present information from the portfolio in a plurality of formats, thereby enabling a student or a faculty member to evaluate the student's progress toward mastering the abilities and associated knowledge in order to make informed plans for improvement.

30 Claims, 5 Drawing Sheets

OTHER PUBLICATIONS

Joseph et al., On line aggregation, ACM SIGMOD International conference on Management of Data, May 1997 pp 1–12.*

James E Corrigan, A database with graphical user interface for inter–course grade comparison, University of Florida, data of Talk: Dec. 7, 1999, pp:11.* www.acs.rochester.edu/acs/div_whatis: Administrative computing services, copy right 1999 2 pages.*

Student information management system, www.iro.hawaii edu/sims/geninfo, pp.:6, last updated:Apr. 9, 1999.*

* cited by examiner

| ABILITY | LEVEL 1 | LEVEL 2 | LEVEL 3 | LEVEL 4 |
|---|---|---|---|---|
| COMMUNICATION | SELF ASSESSES | COMMUNICATES WITH ANALYTIC CONSCIOUSNESS | USES COMMUNICATION TECHNIQUES | INTEGRATES COMMUNICATION ABILITIES |
| ANALYSIS | OBSERVES | INFERS | RELATES | INTEGRATES |
| PROBLEM SOLVING | SELF ASSESSES | DEFINES PROBLEMS | RESOLVES PROBLEMS | IMPLEMENTS AND EVALUATES SOLUTIONS |
| VALUING IN DECISION MAKING | IDENTIFIES OWN VALUES | INFERS IMPLIED VALUES | RELATES VALUES | APPLIES VALUING PROCESS |
| SOCIAL INTERACTION | SELF ASSESSES | ANALYZES GROUPS | EVALUATES SELF AND GROUPS | PERFORMS EFFECTIVELY IN GROUPS |
| EFFECTIVE CITIZENSHIP | SELF ASSESSES | EXAMINES COMPLEX RELATIONSHIPS | EXAMINES MULTIPLE PERSPECTIVES | RESPONDS TO LOCAL AND GLOBAL ISSUES |
| GLOBAL PERSPECTIVES | SELF ASSESSES | DEVELOPS STRATEGIES FOR INFORMED RESPONSE | IDENTIFIES ORGANIZATIONAL STRUCTURES | DESIGNS STRATEGY TO ADDRESS PROBLEM |
| AESTHETIC RESPONSIVENESS | ARTICULATES PERONAL RESPONSE | EXPLAINS PERSONAL RESPONSE | RELATES WORKS TO VARIOUS CONTEXTS | MAKES/DEFENDS QUALITATIVE JUDGEMENTS |

| ABILITY | LEVEL 1 | LEVEL 2 | LEVEL 3 | LEVEL 4 |
|---|---|---|---|---|
| COMMUNICATION | R AC 101<br>W AC 101 | | | |
| ANALYSIS | AC 110<br>CS 103 | AC 110 | | |
| PROBLEM SOLVING | AS 123<br>CS 103 | | | |
| VALUING IN DECISION MAKING | AC151 | | | |
| SOCIAL INTERACTION | AS 123 | | | |
| EFFECTIVE CITIZENSHIP | AS 123 | | | |
| GLOBAL PERSPECTIVES | AC 110<br>AC 151<br>AS 123 | | | |
| AESTHETIC RESPONSIVENESS | AC 110 | | | |

FIG. 5

My Portfolio > Completed > AC101

| Key Performance | Type | Activated | Submitted | Completed | Status |
|---|---|---|---|---|---|
| AC 101 | E | 7/29/99 | 1/6/00 | 1/6/00 | Completed |

| | |
|---|---|
| Designer | Assessment Center |
| Title | Communication Placement Assessment |
| Description | The student produces samples of her reading, and writing. Then, she assesses each performance herself. During a feedback session the student receives feedback on how well she self assessed |
| Criteria | The ability to identify own strengths and weaknesses as a communicator. |
| StimulusText - | Essay |
| Response Mode | Actual - Work Sample |
| Externalities | Criteria By - Department Team; Designed By - Department Team; Judging: Assessed By - Department; Feedback From - Department; Performance:     Administered By - Assessment Center;     Location Administered - Class;     Public Record - Not Public Record; |

Student/Peer Work
Self Assessment
Submitted: 1/6/00     Sue Alverno
Peer Feedback No Attached Work Best Work ☐
Challenge ☐

Assessor/Faculty Feedback
Primary Feedback
1. Feedback Document
   Submitted:1/5/00

2. Performance
   Status
   Overall     S
   Analysis L1     S
   Communication R L1     U
   Communication W L1     S
   Global Perspective L1     S

FIG. 6

USER INTERFACE EDUCATIONAL DATABASE SYSTEM FOR MONITORING PROFICIENCY, PERFORMANCE AND EVALUATION OF STUDENT

BACKGROUND OF THE INVENTION

The present invention relates to the assessment of a student's learning, and more particularly to mechanisms for tracking assessments of performances by a student which demonstrate progress in developing specific abilities.

In a traditional educational institution, students attend class lectures and read assigned materials outside of class. In order to determine the progress toward learning the subject matter of the course, the educators assign papers and other types of projects to the students, as well as periodically administer written examinations. These student performances then are evaluated by the teacher and a grade is assigned indicating the relative quality of the performance. At the completion of a course, the grades for all the performances are averaged to create an overall grade assessing each student's level of mastering the course subject matter.

Secondary schools, colleges, and universities traditionally calculate a cumulative grade point average by averaging the overall grade for each course taken by the student. A student is required to receive a specified number of credit hours of instruction and at least a minimum a cumulative grade point average in order to be graduated from these schools. In traditional educational institutions, other than observing that the student has taken specific courses and received a particular grade in each course, there is no mechanism for the student or teacher to track a student's progress in mastering abilities which are important to a major field of study.

Figure 1:
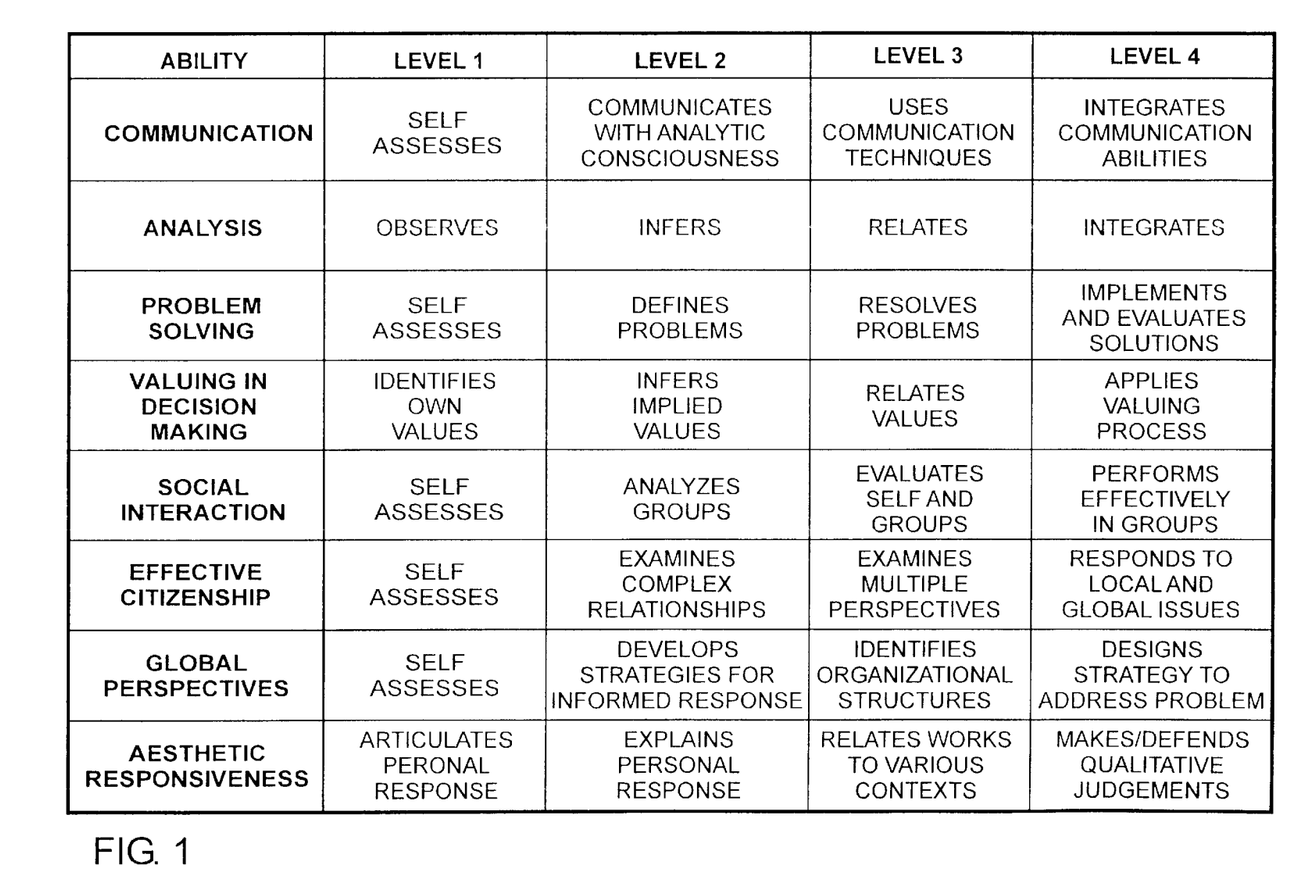
FIG. 1 is a matrix of the abilities and requirements at each level of those abilities which demonstrate a student's learning and development.

An alternative technique for assessing students' learning has been developed by Alverno College in Milwaukee, Wis. That approach identifies eight abilities that students must use to demonstrate sufficient knowledge in order to receive a degree. With reference to FIG. 1, these abilities are: communication, analysis, problem solving, valuing in decision making, social interaction, global perspectives, effective citizenship, and aesthetic responsiveness. Four basic levels of proficiency have been defined for each of the abilities with specific requirements at each level. Additional levels are incorporated into outcome statements required for each student according to the nature of her major. For example, a student majoring in journalism has to demonstrate greater proficiency in the communication ability than a student majoring in chemistry.

Each course provides instruction which enables the student to develop different levels of each of these eight abilities integrated with the subject matter of the course. A student starts out taking courses which satisfy level one of various abilities and with each subsequent year of study takes courses which provide instruction at higher levels of the abilities. Although there are four levels with respect to each ability, the levels do not correspond to each year of a four year program toward receiving a degree. For example, a course taken by a student during her second year of study may provide instruction directed toward ability level one or level three.

During each course, the student is presented with several assignments to prepare performances, such as papers, examinations, speeches, and other projects, which develop and demonstrate proficiency in the associated abilities. For example, a course in a science may present a problem which the student must solve by defining and performing an experiment. Such an assignment would involve the abilities of analysis, problem solving and communication of the results.

Upon the completion of a performance, the student evaluates her performance based on criteria given by the instructor. The instructor performs a similar assessment of the performance which constitutes feedback to the student. The performance is evaluated in the context of whether the student has satisfactorily demonstrated proficiency at the appropriate level of the associated abilities. The students do not receive a traditional grade for each performance or for the course as a whole. Instead the faculty member provides an indication whether the course was completed satisfactorily or unsatisfactorily with a designation of the corresponding levels of ability.

As the student progresses through each course, she compiles a portfolio of information about significant, or key, performances with evaluations by herself, faculty members, sometimes student peers, and perhaps by persons from outside the educational institution who witness the performance. This portfolio should demonstrate a progression through the course to satisfying the requisite abilities. In a larger context, the portfolio of performance evaluations acquired during several years of instruction should demonstrate a progressive mastering of the eight core abilities, both in courses and in other contexts. The student and faculty members periodically review the student's portfolio of key performances in order to evaluate the student's overall progress and analyze where improvement is needed and what strategies might help her education.

In order to perform such an overall evaluation of the student's progress toward proficiency in each ability, the nature and quality (strengths and weaknesses in relation to criteria) of the performances completed inside and outside various courses must be readily available. This may be difficult as the related documents typically are retained in the files of several different departments within a college or university. Even if the performance evaluations are stored centrally, the amount of paper can be voluminous. In addition, it is desirable to organize the performance evaluations in several different ways, such as by ability, level of the abilities, and descriptions or subject areas. Such organization becomes difficult when the performance evaluations are kept as pieces of paper within file folders. Therefore, it is desirable to create a system for storing data regarding student performances from which the information can be presented a number of ways for analysis.

SUMMARY OF THE INVENTION

A database system records, organizes and displays information related to performances of a student which demonstrate her development of competency in the different abilities through which she uses her knowledge as required by an educational institution.

The database system has a data storage structure which for each student contains documentation about a plurality of performances completed by that student and which of the plurality of abilities each performance demonstrates. A user interface is coupled to the data structure and selectively presents information about an extent to which each student has demonstrated proficiency in each of the plurality of abilities within varied knowledge bases.

In the preferred embodiment of the database system, the information about a given performance completed by a student identifies the nature of the given performance, the criteria for successful demonstration, and specifies which of the plurality of predefined abilities are associated with the given performance. An evaluation of the given performance by a faculty member also is stored. The student submits a self assessment of her performance which also is retained in the data storage structure.

The preferred embodiment of the user interface enables the stored information to be organized and displayed in a number of formats. One of which is a two dimensional matrix with the plurality of abilities listed along one axis and different levels of achievement listed along another axis. The matrix has a plurality of cells each associated with one of the plurality of abilities and one of the levels of achievement. Within each cell is a list of courses which t he particular student has completed and other outside course contexts that demonstrate proficiency at the associated ability level. Another display format enables a student to review a given performance and the evaluations thereof.

The database system facilitates review of a student's progress toward satisfying proficiency in each of the abilities prescribed by the educational institution. It enables a student to quickly identify where further work is required and the types of courses that will meet the deficient ability levels. Faculty and administrators also are able to monitor the students' performance and progress via the performance portfolio database.

DETAILED DESCRIPTION OF THE INVENTION

A diagnostic digital portfolio (DDP) of the student's key performances is maintained within a server on a computer network of the school and may be accessed by faculty, students and administrators. Preferably the DDP is accessed as a site on the school's internet site which enables access from on and off campus and inherently provides a graphical user interface that is easily understood by the users. Only authorized persons who have been assigned a user name and password may enter the DDP site. A student is able to review her performances and related assessments, but is prevented from accessing performance information of other students. However, a student in selected cases is able to evaluate another student's performance and her feedback may be inputted into the DDP, as will be described. Authorized faculty members and administrators may access performance information for all students.

Figure 2:
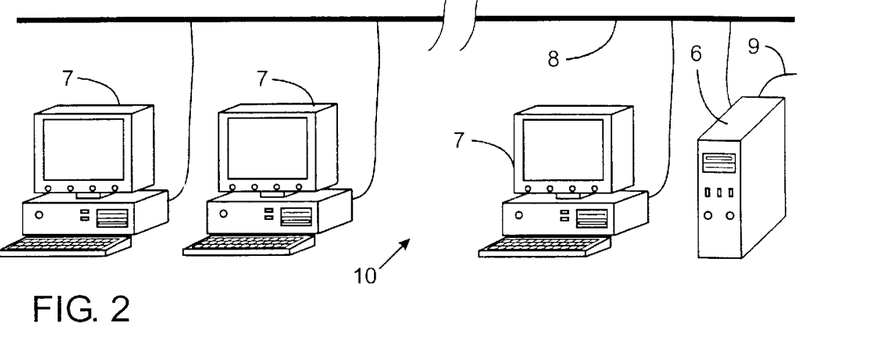
FIG. 2 is diagram representing a computer network for implementing the present diagnostic digital portfolio.

An exemplary computer network 10 at an educational institution is depicted in FIG. 2. That computer network 10 comprises a server 6, on which the data and programs for the DDP are stored, and a plurality of personal computers 7 connected by a communication medium 8 to the server 6. Personal computers at remote locations, such as the homes of students, can access the DDP via an Internet connection 9.

Figure 3:
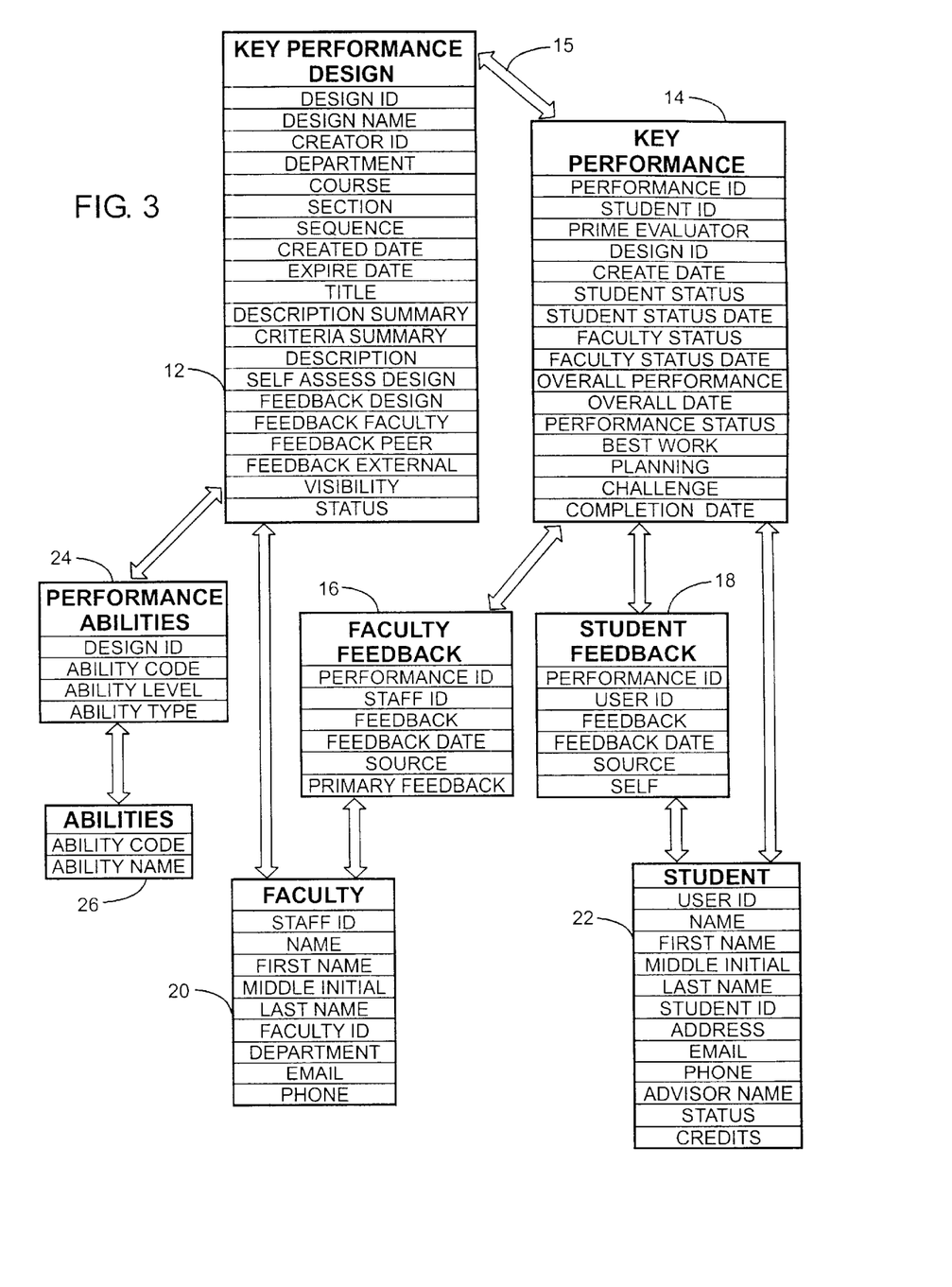
FIG. 3 is a chart of different data tables maintained for recording key performances with the relationship between the data tables being shown.

The data relating to the DDP is stored in a number of tables in the memory of the network server and those tables are related, or linked, as shown in FIG. 3. A KEY PERFORMANCE DESIGN table 12 stores information regarding each significant, or key, performance that an instructor assigns in a particular course or that a student demonstrates in another context, such as by an internship or community service. That table contains a separate file for each key performance for the entire school and each file has several fields of data with the fields for one file shown in table 12. Every key performance design has an unique DESIGN ID which identifies it among all the other designs. The name of the design and an identification code for the faculty member or student who enters the design are stored. Information relating to the department of the school, the particular course, a specific section of that course are retained in this table 12. This information is utilized subsequently to sort and organize performances by specific departments, courses, and specific sections of a course. Because a given course may have several key performances during the semester, a field designated SEQUENCE identifies the order of those key performances of that course. For example, a particular performance may be the third one for a course or it may be a final project. The dates when the key performance design was created and when it will expire are also provided in the table. A title and a summary description of the performance also are retained in this table 12. A full description of the performance can be stored elsewhere on the server as a word processing document and the key performance design table 12 contains a file specification identifying the storage location of that document.

The key performance entries also contain a short textual summary of the criteria for evaluating the performance. A file specification provides a link to a word processor document that contains a full criteria description. The criteria identify the basis on which the performance is assessed and specifies elements that should be considered in the evaluation. Additional file specifications point to word processor documents which specify the criteria and the basis for the student to perform a self assessment and for faculty member use in providing feedback to the student. One should understand that the factors to be considered during self assessment by the student may focus on different aspects of the evaluation criteria than those considered by the faculty member. Hence, there are separate stimulus documents for prompting consideration of specific factors during each type of performance. Additional fields are provided to store file specifications of word processor documents which contain the feedback criteria for student peers or others to assess the student's performance. A field designated visibility is provided as a flag to indicate whether students may browse the key performance design or not. In some instances, a faculty member may not wish the students in a particular class to be able to see the key performance design information until the time of assessment. A status field is provided to indicate whether the key performance design has been completed or is still in a draft state.

Each key performance involves one or more of the abilities for which a student must demonstrate different levels of proficiency in order to advance and receive a degree. In that regard, the diagnostic digital portfolio contains a data table 24 that stores information regarding the abilities associated with each performance in the KEY PERFORMANCE DESIGN table 12. The records in the PERFORMANCE ABILITIES table 24 have a field that identifies the related performance by the associated DESIGN ID for the performance. Each such record also identifies a particular ability associated with the designated performance. A code that identifies the ability and its ability level corresponding to the matrix FIG. 1 are provided in the PERFORMANCE ABILITIES table 24. A particular ability may be divided into several sub-abilities, for example, the communication ability has constituent sub-abilities for writing, speech, listening, reading, and others. Not all of the sub-abilities may be associated with a particular performance. As a consequence, each record of the PERFORMANCE ABILITIES table 24 may designate a particular sub-ability. For a particular performance there may be multiple records entered into the PERFORMANCE ABILITIES table 24, one for each associated ability and sub-ability. The performance ability table 24 is linked to an ABILITIES table 26 that contains the ability code and the name of the ability.

The key performance design table 12 also is linked to a KEY PERFORMANCE table 14 which has a separate record for each key performance of each student. The KEY PERFORMANCE table 14 contains status information relating to the student key performances. Each record in this table 14 indicates whether an assessment has been submitted by each evaluator and whether the evaluation of that key performance is complete. The fields for one of these records is depicted in FIG. 3. Each performance is assigned a unique identification number in order to distinguish its record from all the other performance records in the data table 14. The ID number for the particular student being evaluated is entered into another field, along with the computer network user identification for the primary evaluator.

An identification is provided of the KEY PERFORMANCE DESIGN to which this particular key performance relates, thereby providing a link, represented by arrow 15, to a particular entry in the KEY PERFORMANCE DESIGN table 12. The date that the key performance was performed is specified. Fields also are provided in the KEY PERFORMANCE table 14 to indicate whether the student and the faculty member have completed their assessments of the performance and the date on which each assessment was entered into the DDP. An overall performance evaluation field indicates whether the performance has been completed satisfactorily (S), unsatisfactorily (U), or is still in progress (I). As an alternative to grades of satisfactorily or unsatisfactorily (pass/fail), traditional letter or numerical grade rankings may be used. Other fields are provided to indicate the nature of the performance, whether it is a "Best Work," whether or not it is "Challenging," and then when the entire performance evaluation has been completed. The key performance table 14 is linked to a faculty feedback table 16 and a student feedback table 18 in which data regarding the actual assessments of the performance are stored.

The FACULTY FEEDBACK table 16 contains a record for each performance evaluation stored in the diagnostic digital portfolio (DDP). This table 16 contains the Performance ID for the particular performance being evaluated, thereby providing a link to the associated record in the KEY PERFORMANCE table 14 to which the feedback relates. The FACULTY FEEDBACK table 16 has a field for an identification of the person making the evaluation and has a FEEDBACK field which contains the file specification of a word processor document that contains the actual feedback from the faculty member. The date on which the feedback was entered into the system also is provided. A SOURCE field indicates the origin of the feedback which is most cases will be the same individual as identified in the staff ID field. However, there may be situations where a generic staff ID is used and thus some identification of the individual beyond the staff ID must be provided. Another field in the FACULTY FEEDBACK table 16 stores an indication whether this is the primary feedback for the performance or a secondary feedback. For example, a teaching assistant, in addition to the course instructor, may evaluate the student's performance. Thus, the last field in the faculty feedback table provides a mechanism for indicating the type (primary or secondary) of that faculty member's feedback.

The student feedback table 18 contains a similar set of fields for information relating to the student's self assessment of her performance. In this table 18, the PERFORMANCE ID provides to link the associated record for this particular key performance in the KEY PERFORMANCE table.

An identification of the student is provided, as well as a field designated FEEDBACK which holds a file specification of the word processor document containing the actual assessment, providing a link to that document. The date on which the feedback was entered into the system is indicated. In addition, a field designated SELF is provided to denote whether this evaluation is from the student who conducted the performance or from a student peer who is evaluating another student's performance. The DDP accommodates external evaluations, such as those by members of the community who are not faculty or students. The source field indicates these kinds of evaluations.

The diagnostic digital portfolio also contains a FACULTY table 20 storing biographical information about each faculty member who may design or evaluate a key performance. Each record in that FACULTY table 20 contains an identification number of the person, his or her system name and full name, a faculty identification number, and information regarding the department of the school in which they are assigned. Additional information, such as email and phone numbers, may be provided.

The FACULTY data table 20 is linked to both the KEY PERFORMANCE DESIGN table and the FACULTY FEEDBACK table in order to provide the biographical information when the system accesses data in those other tables. The FACULTY data table may be linked to other tables of the system which refer to a particular faculty member.

Similarly, the STUDENT table 22 contains biographical information for those people. That information includes the student's network identification number, her network name, full name, college ID number, and residence address. Fields are included to store the student's email address and phone number. Additional information is stored in fields for a student advisor's name, the student's status with university (e.g., active, inactive, transferred, dismissed, etc.) and the number of credits she has received.

The STUDENT data table 22 is linked to both the KEY PERFORMANCE table 14 and the STUDENT FEEDBACK table 18 as those tables both contain information which identifies the student entering information in those tables and thus require student data table to be used to look up information such as the student's name.

It will be understood by those knowledgeable with databases and computer programming that additional tables may be provided to store other types of information which are linked to other tables or utilized by the DDP system.

Figure 4:
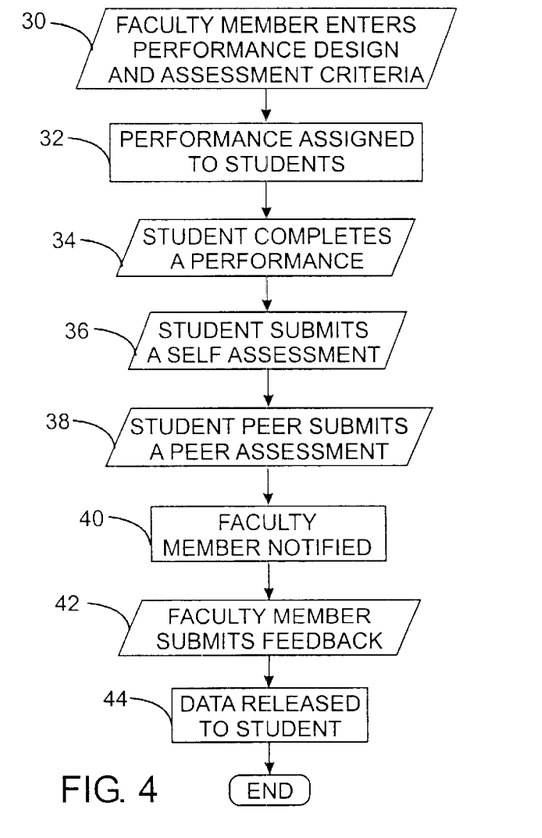
FIG. 4 is a flowchart depicting a process by which information is entered into the data tables.

The entry of data into the different tables 12–26 is best understood in the context of the preparation and completion of a performance as depicted by the flowchart of FIG. 4. The process begins with the faculty member accessing the DDP internet site which causes the DDP Faculty Home Page to be displayed on the computer screen. The DDP Faculty Home Page contains several buttons for selecting different functions of the DDP system. At this time the user selects the button associated with designing a key performance. That selection opens up a form having blank areas in which the faculty member enters information about the design of the key performance. That information corresponds to the fields of a record in the KEY PERFORMANCE DESIGN table 12. Thus at step 30 in FIG. 4 the faculty member designs a performance by filling out the key performance design form on her computer screen and then transferring the data to the DDP memory section of the network server.

Upon completing the key performance design form, the faculty member has the option of clicking the cursor on buttons which can save the design in draft form, activate the key performance design for use by the DDP, or delete the draft design. By saving the design in its draft form the user is able to work on the performance design at different points in time and even have others proof the design before activating it. The system stores the design with a draft status in the last field of the table record 12 shown in FIG. 3. Upon accessing the DDP, a faculty member is afforded the opportunity of reviewing all of their designs and selecting any one on which to work. When the design is completed, clicking on the ACTIVATE button changes the status to ACTIVE in the data file of the key performance design table 12.

The faculty member also is able to access and review all of his or her active designs or all of the active designs in the system regardless of the creating faculty member. At the expiration date of a given performance design its status is changed to ARCHIVE and the user also is able to select for review all his or her archived performance designs. By accessing these various categories of performance designs the faculty member is able to obtain information for use in creating a new performance design for a course.

After the key performance has been designed and activated in the DDP system, it can be assigned at step 32 to individual students either by a faculty member or by each student. At that time, the faculty member may enter the DDP system, select the particular active key performance design, and designate the students to whom the performance is assigned. Specifically, the faculty member can either enter the student's name or school ID number in an appropriate field. As each student is assigned the performance, a record is created in the KEY PERFORMANCE table 14.

Alternatively a key performance may be assigned by the students in response to a notice from an instructor. In this case each student in the class accesses the DDP and browses through the active Key Performance Designs that have been designated as visible to the students. When the student locates the designs for the Key Performance designated by the instructor, she designates that the key performance should be added to her list of work in progress.

Regardless of the manner in which a Key Performance was assigned to a given student, the student can view her uncompleted Key Performances via the DDP system. From the DDP Student Home Page, the student can select a button marked MY WORK and bring up a display of all her assignments that have not been fully completed. By clicking on the designation of an assigned key performance, the student is able to review the details of that assignment and the criteria against which her work will be evaluated.

Eventually the student completes the performance at step 34, such as submitting a paper to the instructor, making a presentation to the class, or whatever the performance may be. Thereafter at step 36, the student conducts a self assessment of her performance by accessing the MY WORK section in the DDP system and selecting the particular performance. The student then chooses the self assessment option in the display which brings up an assessment form with the relevant evaluation criteria. That form is generated from the data in the associated KEY PERFORMANCE DESIGN record in table 12. The student then completes the form by providing to all of the information requested. At the end of the form, the student then clicks on a button to submit the self assessment document.

The DDP responds to the self assessment submission by storing text of the self assessment in the word processor file area of the network server and by updating the contents of tables in the DDP system. Specifically, a new record is created in the STUDENT FEEDBACK table 18 identifying the related Key Performance, the file specification of the word processor document for the assessment, and the other information described previously. At that time, entries also are made in the KEY PERFORMANCE table 18 for that performance by that student, indicating that she submitted the self assessment and the date of that submission.

At step 38, if the Performance Design indicates that peer review also will be performed one or more additional students submit evaluations of this performance in a similar manner to that by which the self assessment was submitted. However, the criteria employed in a peer evaluation of another student's performance may be different than that used for the self assessment, depending upon the key performance design.

Periodically, each faculty member accesses the diagnostic digital portfolio system and reviews the performances which have been assigned to his or her students. Usually, the faculty member determines whether students have submitted their own self assessment at which point the faculty member may submit an evaluation. The student cannot observe the faculty member's evaluation before submitting a self review of her performance.

Once the student has submitted her self assessment, an indication is provided to the faculty member of that fact. This may be accomplished by placing an indicator adjacent to the student's name in the list of students to whom this performance has been assigned. Thus, when the faculty member accesses the DDP and looks at the information related to the key performance, the faculty member can determine which students have completed their self assessment and thus know that the faculty feedback can be prepared.

At the faculty member's pleasure, she accesses the feedback section of the DDP and select the particular Key Performance from the list of ones that she has assigned. On the display screen for that key performance screen that faculty member is able to pull down a list of the students in the class and select one to assess. The Key Performance information then is displayed and by further clicking on an appropriately labeled box the form with the faculty assessment criteria will appear.

The faculty member completes the form and submits it to the DDP. In response to that submission, a new record is created in the FACULTY FEEDBACK table 16 identifying the related Key Performance, the file specification of the word processor document for the faculty assessment, and the other information described previously. At that time, entries also are made in the KEY PERFORMANCE table 18 for that performance by that student, indicating that faculty member has submitted an assessment Thereafter, at any time the student may access the data regarding this particular Key Performance and review the faculty member's feedback. The faculty member for the course or other faculty members may also access this student's key performance data at any time.

Figure 5:
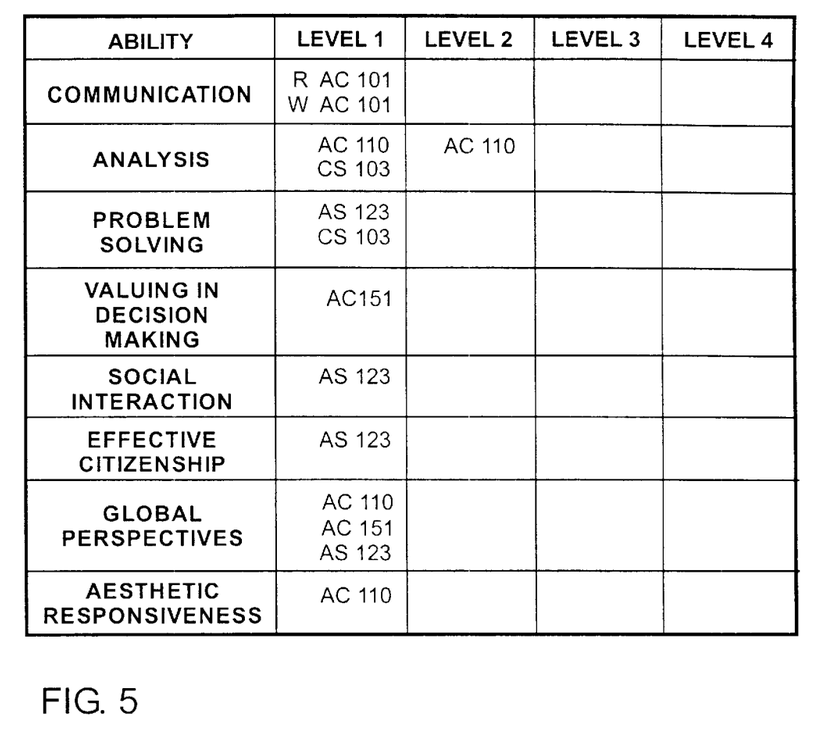
FIG. 5 is a matrix created by the diagnostic digital portfolio which indicates satisfactory completion of courses and other performances that demonstrate proficiency in various ability levels.

A student can review her key performances in the DDP by accessing the system and selecting a button labeled MY PORTFOLIO on the DDP student Home Page. This brings up a matrix similar to the one shown in FIG. 5, which has rows corresponding to each of the eight abilities and columns for the four levels for those abilities. Within each cell of the matrix is a listing of the courses which have been satisfactorily completed to fulfill the requirements for that ability at the associated level. For example, Assessment Center performance AC101 applies to Communication Level one requirements in the reading and writing sub-abilities.

Figure 6:
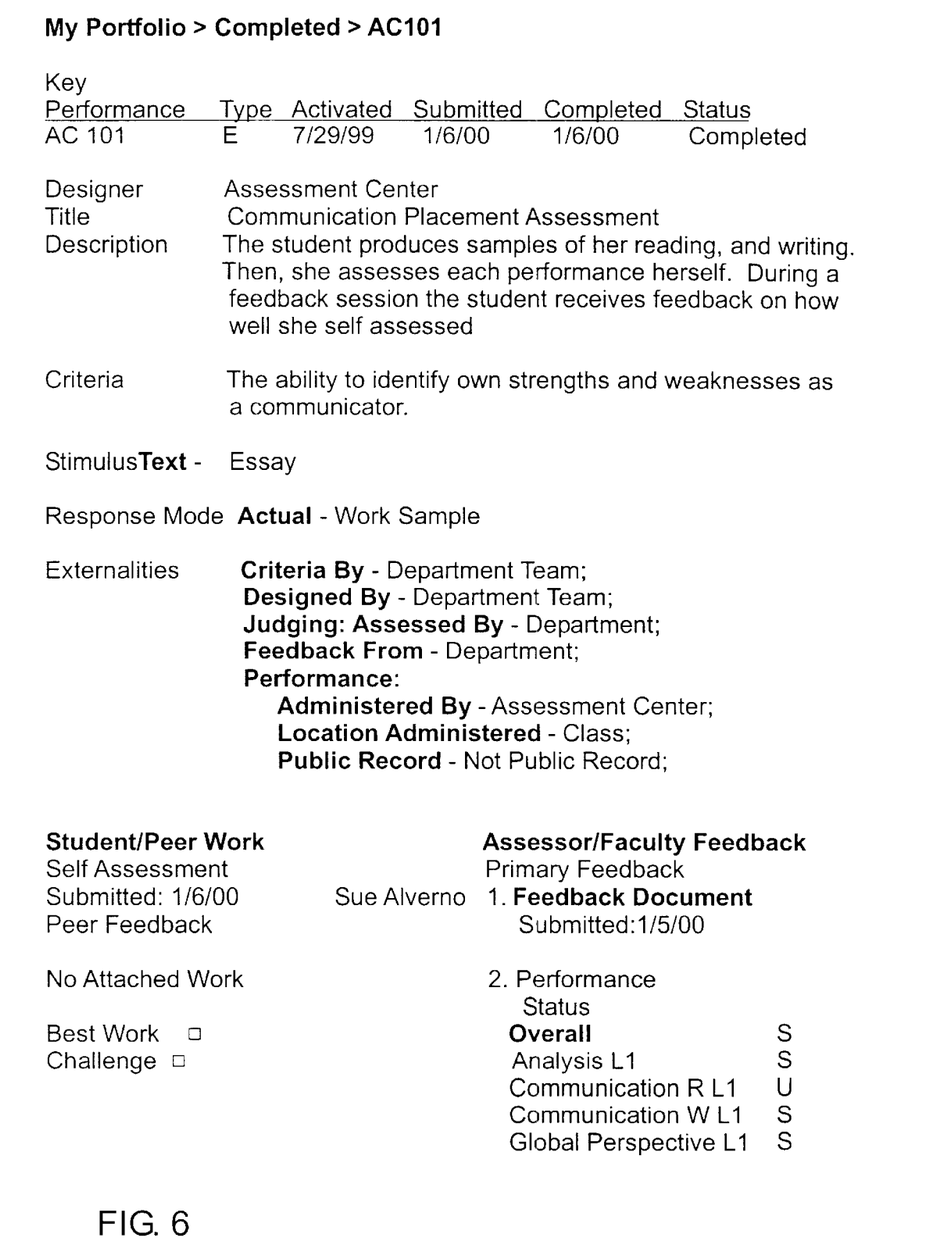
FIG. 6 represents a typical display of information related to a particular performance.

The user is able to click on a key performance to display general information about that key performance. This forms a display similar to that shown for FIG. 6 which presents data from the KEY PERFORMANCE DESIGN table 12 maintained by the DDP. Specifically, the key performance (e.g. AC101), the title of the performance and its description and criteria summaries are displayed. Additional information is obtained from other tables in the DDP system. For example, in the lower right corner of the display, information is provided about the faculty feedback for this student named Sue Alverno. That feedback includes whether the overall performance was Satisfactory and whether each of the abilities associated with the performance was Satisfactorily completed. These individual abilities are reflected in the entries in the matrix of FIG. 5.

Students also are able to save the actual performances which involve written documents, such as spreadsheets or word processor documents, or audio visual materials. A data table in the DDP provides a record for each student which lists the Key Performances that she has stored in the system. It should be noted that a student will not store every key performance, but only the most significant ones which demonstrate her progress in the eight abilities. The record for the student in this table contains the file specification that indicates the location of word processor document, a spread sheet, or other type of text material stored on the network server. The DDP Student Home Page provides a button for accessing this listing of performance documents. By clicking on an item of that listing the actual document can be retrieved and displayed.

As with any complex software system, help screens and informational items may be provided for accessing by the users to assist in their utilization of the DDP system.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A database system for tracking achievement of students of an educational institution where each student must demonstrate proficiency in every one of a plurality of abilities, proficiency in each ability is demonstrated by completing a plurality of performances in a series of courses in a curriculum of the educational institution, each course typically relates to more than one of the plurality of abilities, that database system comprising:

a data entry device by which a person indicates when a student has satisfactorily completed a performance assigned in one of the plurality of courses;

a data storage structure which for each student contains an identification of a plurality of performances satisfactorily completed by that student and an identification of which of the plurality of abilities are associated with each of the plurality of performances; and a user interface coupled to the data storage structure to retrieve data regarding the plurality of performances and to selectively present information about an extent to which each student has demonstrated proficiency in the plurality of abilities.

2. The database system as recited in claim 1 wherein the data storage structure further contains an evaluation of each of the plurality of performances, wherein each evaluation is provided by a person other than a student.

3. The database system as recited in claim 1 wherein the data storage structure further contains an evaluation of each of the plurality of performances, wherein each evaluation is provided by a student.

4. The database system as recited in claim 1 wherein the data storage structure further contains a grade for each of the plurality of performances.

5. The database system as recited in claim 1 wherein the data storage structure contains, for each of the plurality of performances, a grade for each associated ability.

6. The database system as recited in claim 1 wherein the user interface creates a display for a particular student that lists each of plurality of abilities and which performances the particular student has completed to demonstrate proficiency in the plurality of abilities.

7. The database system as recited in claim 1 wherein the user interface creates a display for a particular student that lists the plurality of abilities and which courses at the educational institution the particular student has completed to demonstrate proficiency in each ability.

8. A database system for tracking achievement of students of an educational institution where each student must demonstrate proficiency in a plurality of abilities, proficiency in each ability is demonstrated by completing a plurality of performances in a series of courses, each course typically relates to more than one of the plurality of abilities, said database system comprising:

a data structure containing a separate record for each of a plurality of performances completed by a student, each record containing an identification of a given performance, an identification of the student, an identification of the course in which the given performance was assigned, an identification of which of the plurality of predefined abilities are associated with the given performance, and a first evaluation of the given performance wherein the first evaluation was made by a person; and a user interface coupled to the data structure and to selectively present information about the plurality of performances.

9. The database system as recited in claim 8 wherein each record in the data structure further contains a second evaluation of the given performance, which second evaluation is provided by the student.

10. The database system as recited in claim 9 wherein the user interface inhibits a student from accessing the first evaluation until the second evaluation has been entered into the database system.

11. The database system as recited in claim 9 wherein each record contains a link to a word processor document that contains the second evaluation.

12. The database system as recited in claim 8 wherein the first evaluation contains a link to a word processor document that contains a verbal evaluation.

13. The database system as recited in claim 8 wherein the first evaluation contains a grade for each of the plurality of predefined abilities associated with the given performance.

14. The database system as recited in claim 8 wherein each record in the data structure further contains a designation of a course in the curriculum of the educational institution to which the given performance relates.

15. The database system as recited in claim 14 wherein the user interface creates a display which indicates courses that a particular student has completed and which of the predefined abilities are associated with each course.

16. The database system as recited in claim 8 wherein the user interface creates a display indicating performances that a particular student has completed and which of the plurality of predefined abilities relate to each completed performance.

17. A database system for tracking achievement of students of an educational institution where each student must demonstrate proficiency in a plurality of abilities, proficiency in each ability is demonstrated by completing a plurality of performances in a series of courses, each course typically relates to more than one of the plurality of abilities, said database system comprising:

a performance design data structure containing a separate design record for a plurality of performances, each design record identifying a particular performance for assignment to students, a course in which the performance is assigned, a description of the performance, an identification of which of the plurality of abilities are associated with the particular performance, and criteria for assessing how well a student has completed the particular performance;

a performance data-structure containing a separate performance record for each performance assigned to each student which separate performance record is linked to a design record in the performance design data structure, each performance record containing an identification of a given performance, and an identification of a student to whom the given performance has been assigned;

a feedback data structure containing a plurality of feedback records each linked to a performance record in the performance data structure, and each feedback record storing an evaluation of the given performance identified in the linked performance record wherein the evaluation was made by a person who observed the performance; and a user interface coupled to the performance design data structure, the performance data structure and the feedback data structure, and selectively presenting information about performances completed by a student.

18. The database system as recited in claim 17 wherein the user interface creates a display for a particular student that lists the plurality of abilities and which performances the particular student has completed which demonstrate proficiency in each of the plurality of abilities.

19. The database system as recited in claim 17 wherein for a particular student the user interface creates a two dimensional matrix display in which the plurality of abilities are listed along one axis and different levels of achievement are listed along another axis, the matrix has a plurality of cells each associated with one of the plurality of abilities and one of the levels of achievement, within each cell is a list of performances that the particular student has completed that demonstrate proficiency in an associated ability.

20. The database system as recited in claim 17 wherein the feedback data structure contains evaluation information from a faculty member at the educational institution.

21. The database system as recited in claim 20 wherein the feedback data structure contains a grade for each of the plurality of abilities associated with the given performance.

22. The database system has recited in claim 20 wherein the feedback data structure contains a grade for the given performance.

23. The database system as recited in claim 17 wherein the feedback data structure contains an evaluation by the particular student who gave the given performance.

24. The database system as recited in claim 17 wherein each performance record indicates whether the given performance has been completed by the particular student.

25. The database system as recited in claim 17 wherein the user interface creates a display indicating uncompleted performances that have been assigned to a particular student.

26. The database system as recited in claim 17 wherein each performance record contains a link to a file that contains the performance of the particular student.

27. A computer readable storage medium for an educational institution where students must demonstrate proficiency in a plurality of predefined abilities by completing a plurality of performances in a series of courses, each course typically relates to more than one of the plurality of abilities, said computer readable storage medium comprising:

a data structure containing a data for a plurality of performances completed by a student, the data related to each performance containing an identification of a given performance, an identification of the student, an identification of the course in which the given performance was assigned, an identification of which of the plurality of predefined abilities are associated with the given performance, and an evaluation of the given performance which evaluation is made by a person who observed the performance.

28. The computer readable storage medium as recited in claim 27 wherein each record contains a link to a word processor document that contains text related to the evaluation.

29. The computer readable storage medium as recited in claim 27 further comprises a word processor document that contains text related to the evaluation.

30. The computer readable storage medium as recited in claim 27 wherein the evaluation contains a grade for each of the plurality of predefined abilities associated with the given performance.

* * * * *